United States Patent
Liu et al.

(10) Patent No.: US 10,805,002 B2
(45) Date of Patent: Oct. 13, 2020

(54) MULTIPLE NARROW BANDWIDTH CHANNEL ACCESS AND MAC OPERATION WITHIN WIRELESS COMMUNICATIONS

(71) Applicant: Avago Technologies International Sales Pte. Limited, Singapore (SG)

(72) Inventors: Yong Liu, Campbell, CA (US); Ron Porat, San Diego, CA (US); Nihar Jindal, Mountain View, CA (US); Vinko Erceg, Cardiff by the Sea, CA (US); Matthew James Fischer, Mountain View, CA (US); Chiu Ngok Eric Wong, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 45 days.

(21) Appl. No.: 15/649,430

(22) Filed: Jul. 13, 2017

(65) Prior Publication Data
US 2017/0310386 A1 Oct. 26, 2017

Related U.S. Application Data

(63) Continuation of application No. 14/252,646, filed on Apr. 14, 2014, now Pat. No. 9,712,231.

(60) Provisional application No. 61/811,861, filed on Apr. 15, 2013, provisional application No. 61/834,240, filed on Jun. 12, 2013, provisional application No. 61/973,361, filed on Apr. 1, 2014.

(51) Int. Cl.
*H04B 7/26* (2006.01)
*H04W 74/00* (2009.01)

(52) U.S. Cl.
CPC ........ *H04B 7/2612* (2013.01); *H04W 74/006* (2013.01)

(58) Field of Classification Search
CPC .......................... H04W 74/006; H04B 7/2612
See application file for complete search history.

(56) References Cited

U.S. PATENT DOCUMENTS

| 2008/0056125 | A1  | 3/2008 | Kneckt et al. |
| 2012/0063433 | A1  | 3/2012 | Wentink |
| 2013/0235720 | A1* | 9/2013 | Wang ................ H04W 28/0278 370/229 |
| 2014/0071873 | A1  | 3/2014 | Wang et al. |

(Continued)

*Primary Examiner* — Jae Y Lee
(74) *Attorney, Agent, or Firm* — Foley & Lardner LLP

(57) ABSTRACT

A wireless communication device is implemented to include a communication interface and a processor. The processor is configured to process communications associated with the other wireless communication devices within the wireless communication system to determine one or more traffic characteristics of those communications as well as one or more class characteristics of the other wireless communication devices. The processor is configured to classify the communications into one or more access categories based on the one or more traffic characteristics and is configured to classify the other devices into one or more device class categories based on the one or more class characteristics. The processor is then configured to generate one or more channel access control signals based on these classifications. The communication interface of the device is configured to transmit the one or more channel access control signals to one or more of the other devices.

20 Claims, 10 Drawing Sheets

(56) References Cited

U.S. PATENT DOCUMENTS

| | | | |
|---|---|---|---|
| 2014/0328265 A1* | 11/2014 | Sampath | H04W 72/082 370/329 |
| 2016/0100230 A1* | 4/2016 | Ma | H04N 21/44209 725/109 |
| 2017/0055279 A1* | 2/2017 | Janis | H04B 17/318 |

* cited by examiner

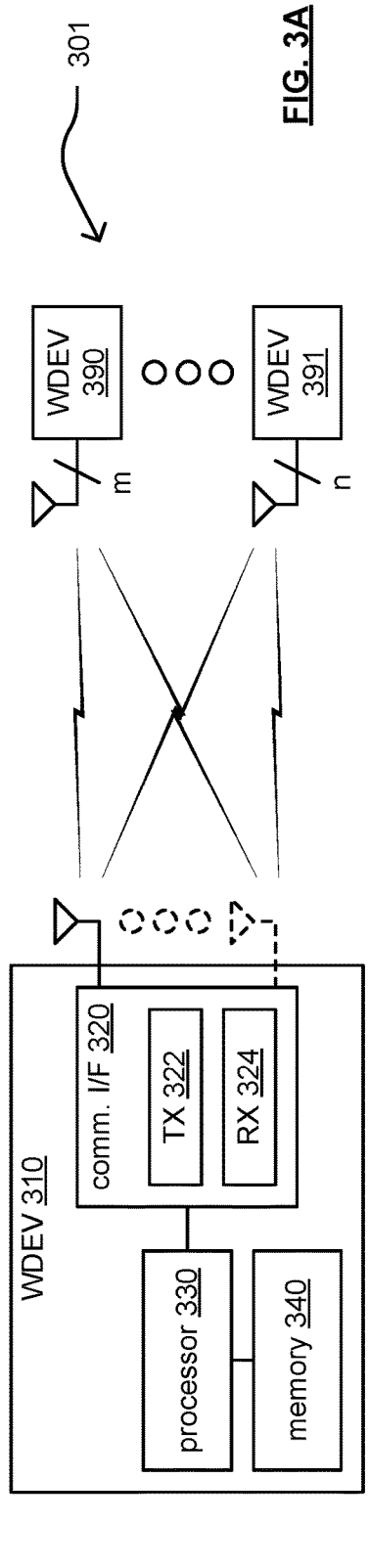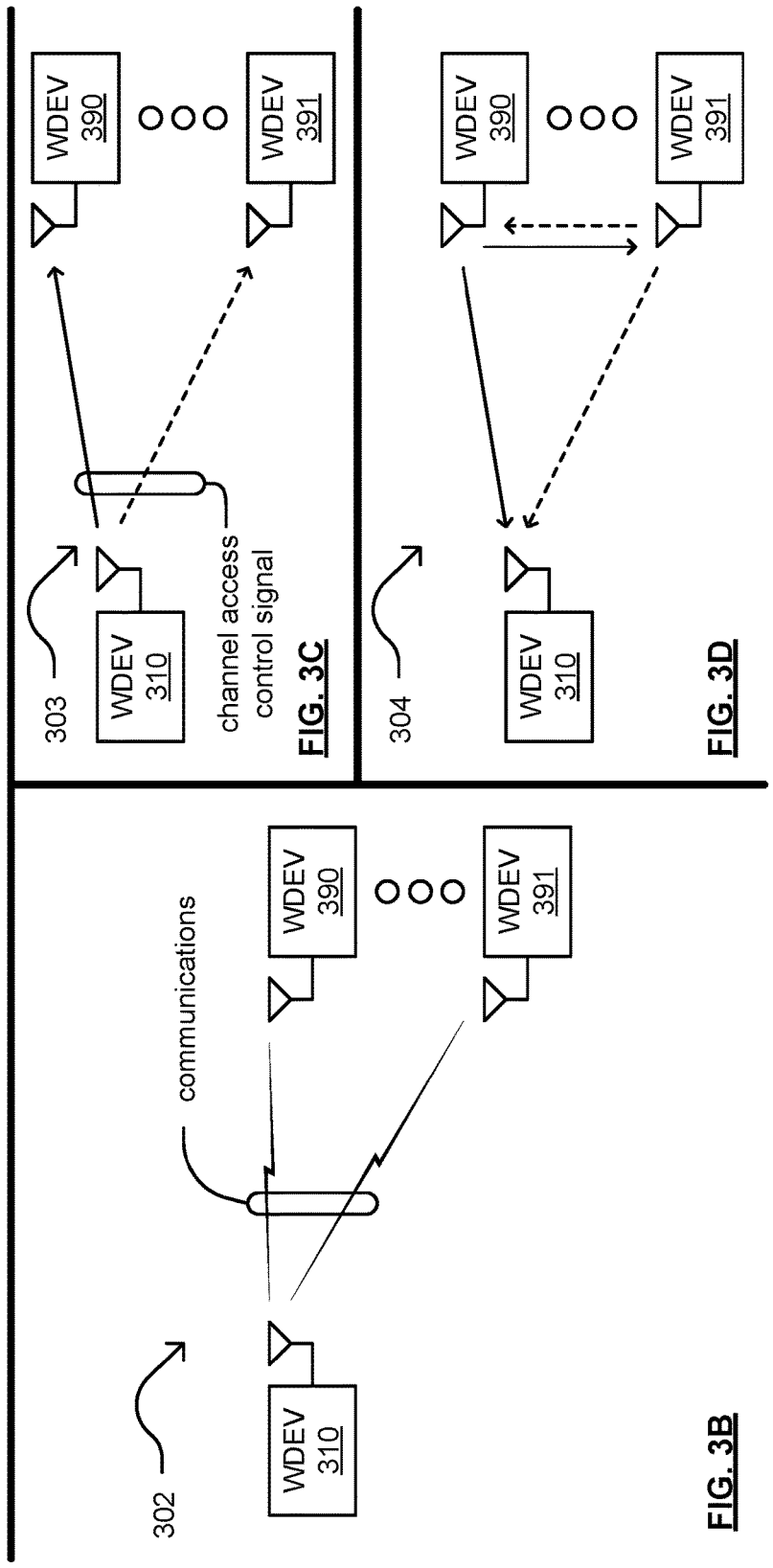

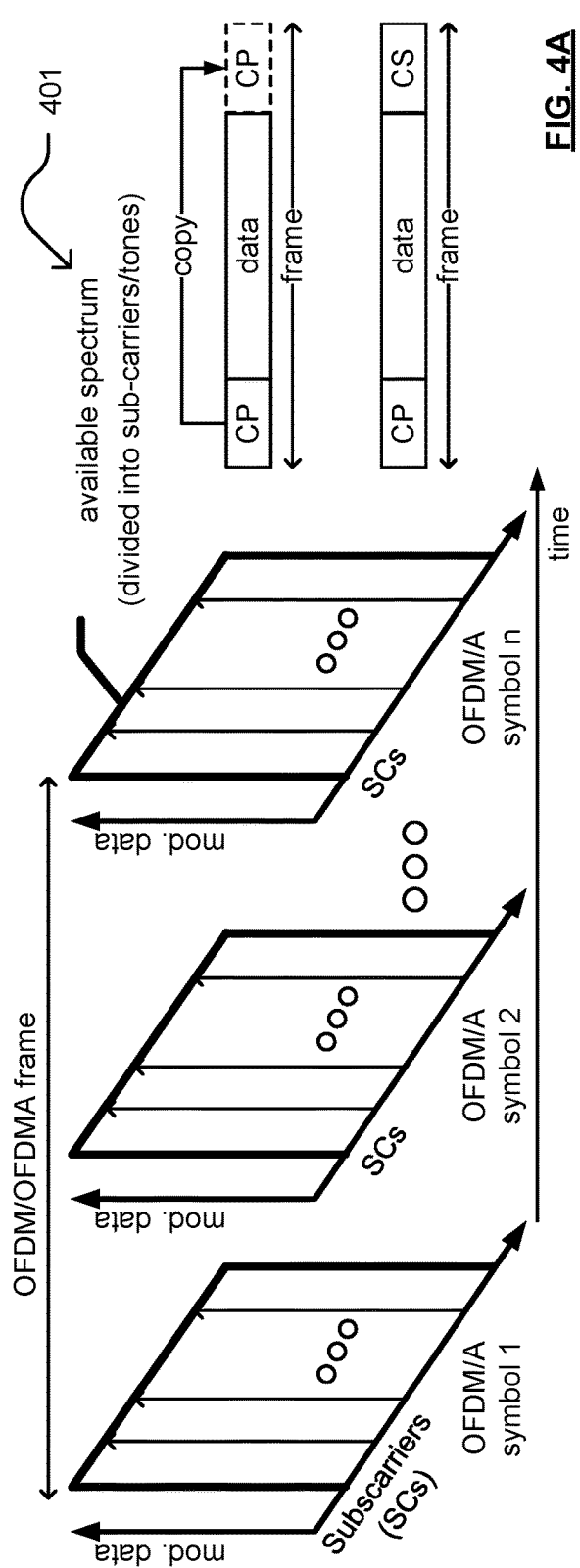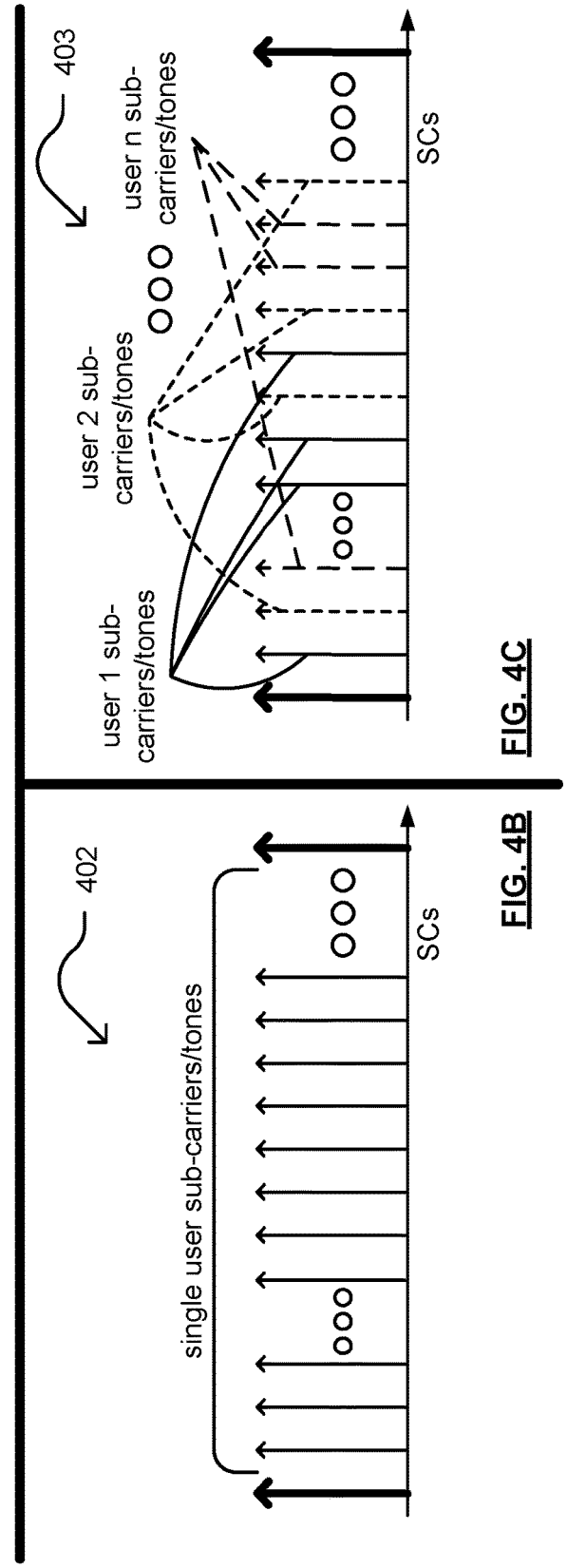
FIG. 4A
FIG. 4B
FIG. 4C

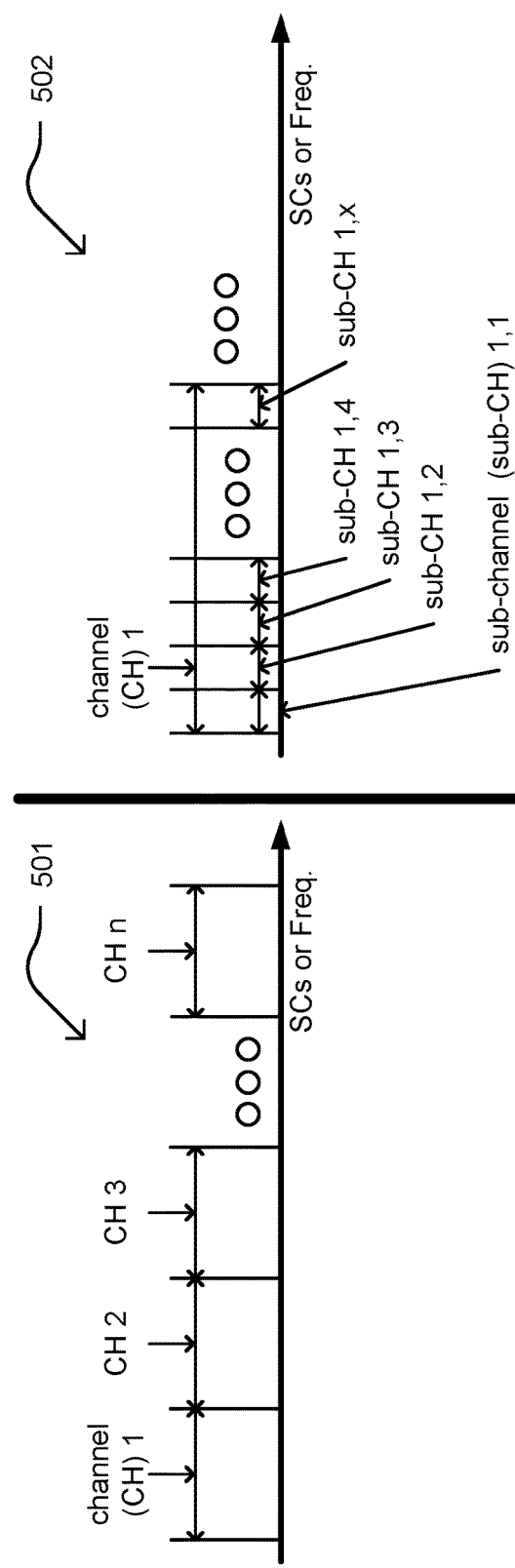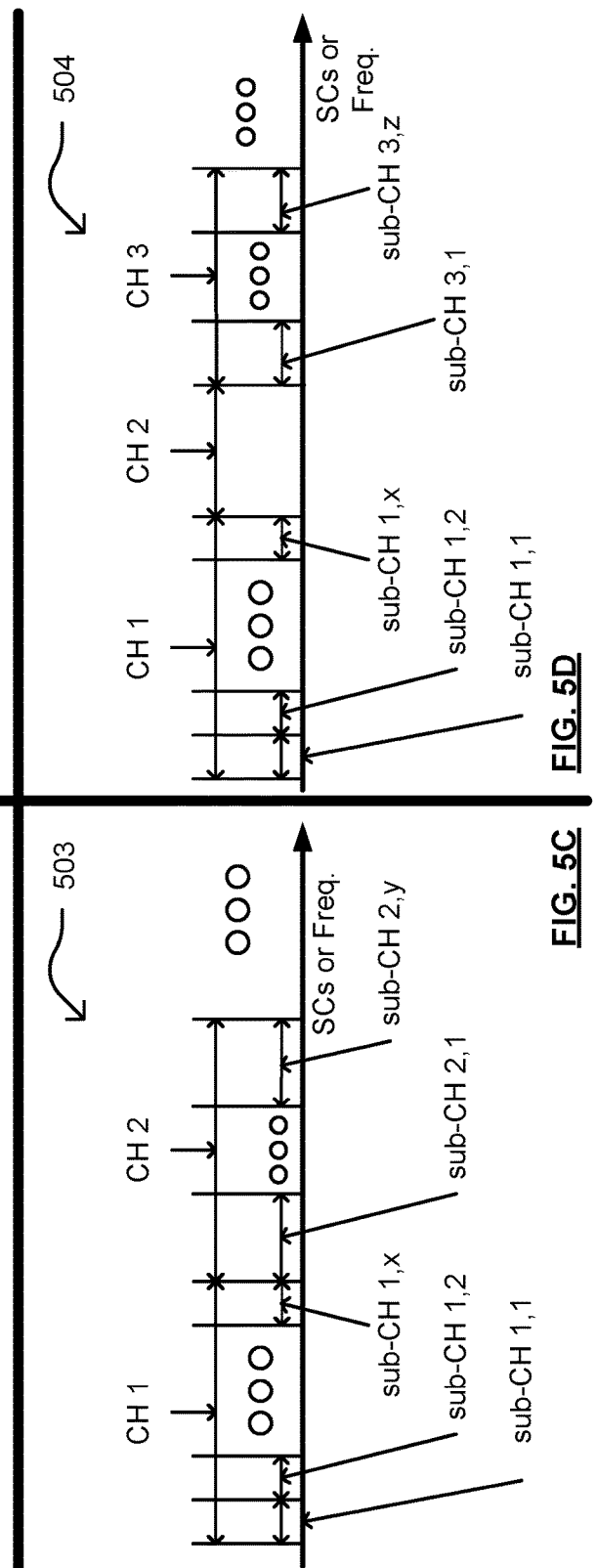
FIG. 5A
FIG. 5B
FIG. 5C
FIG. 5D

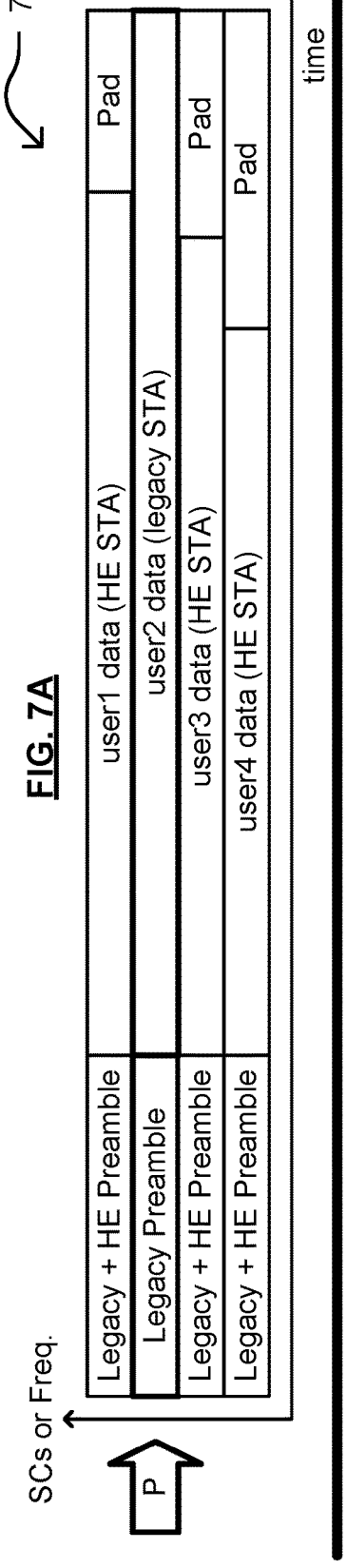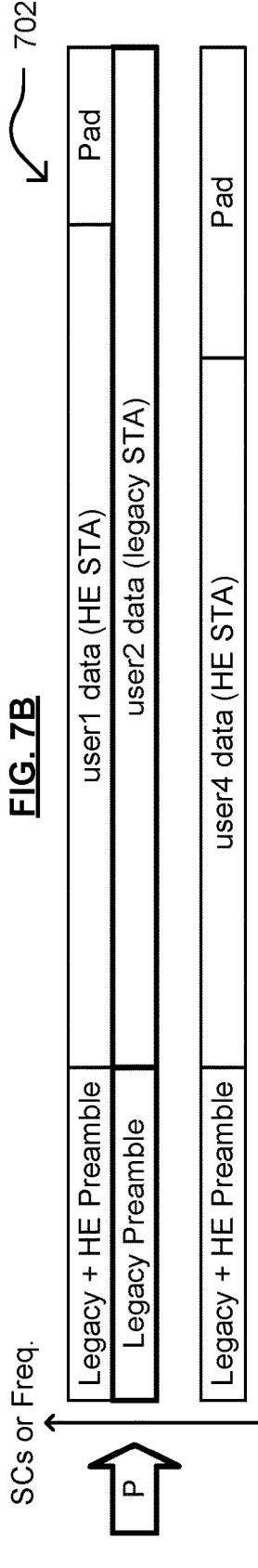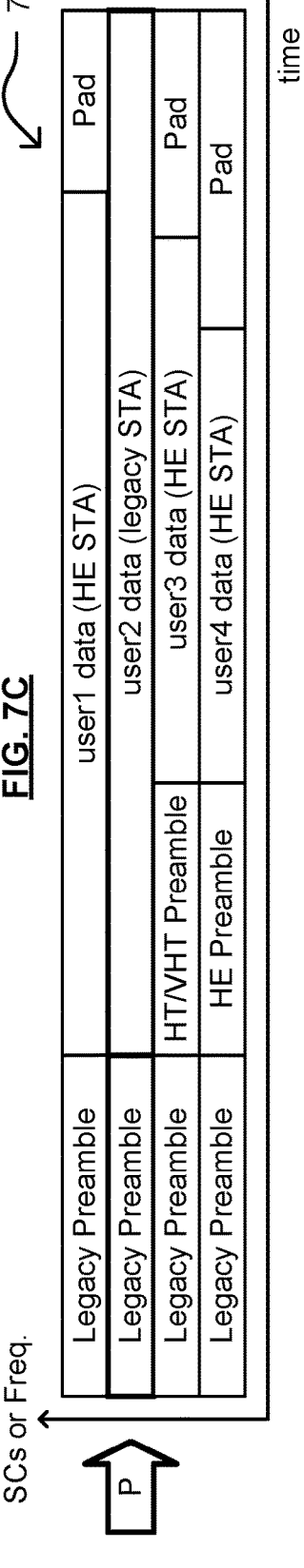

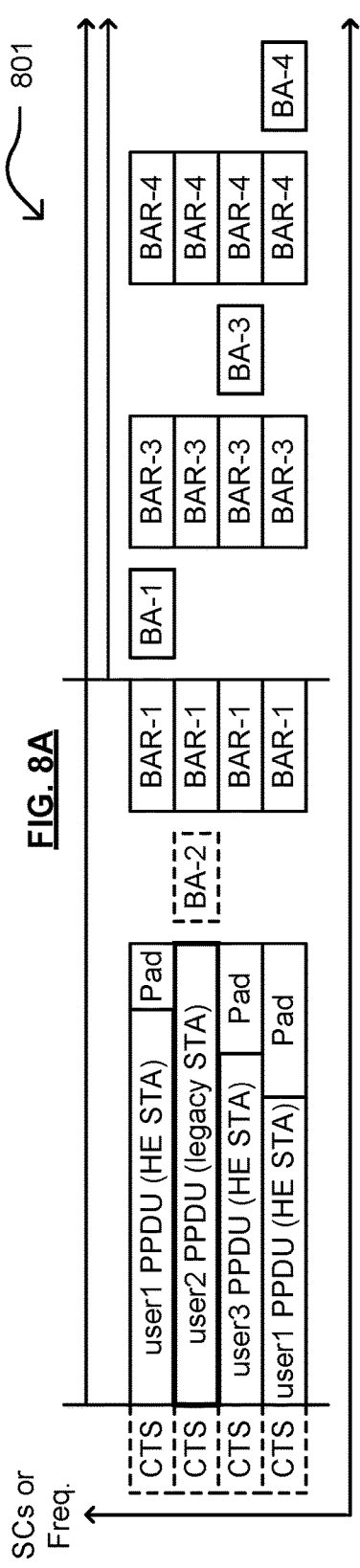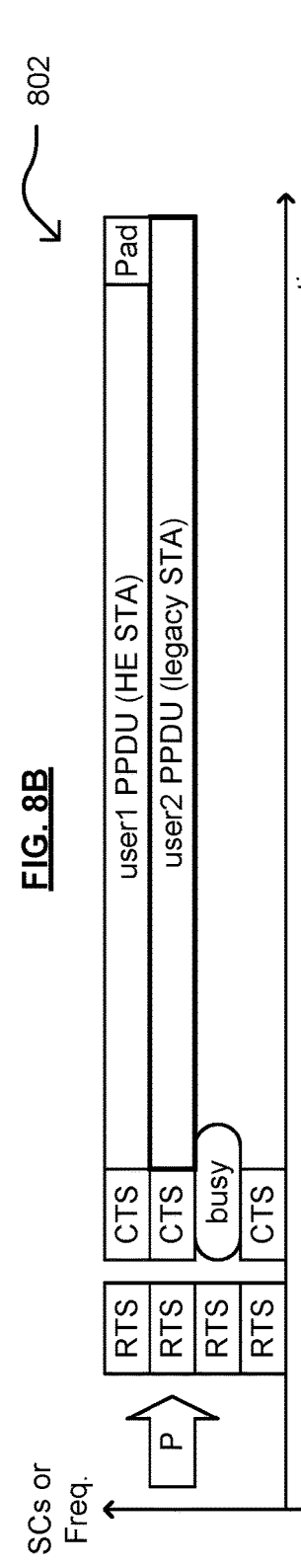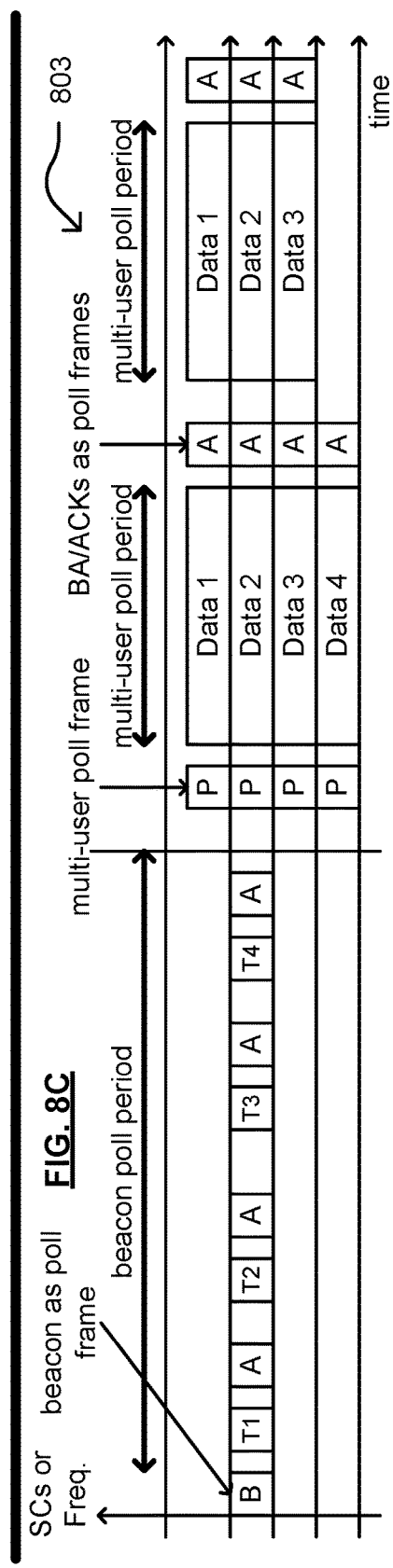

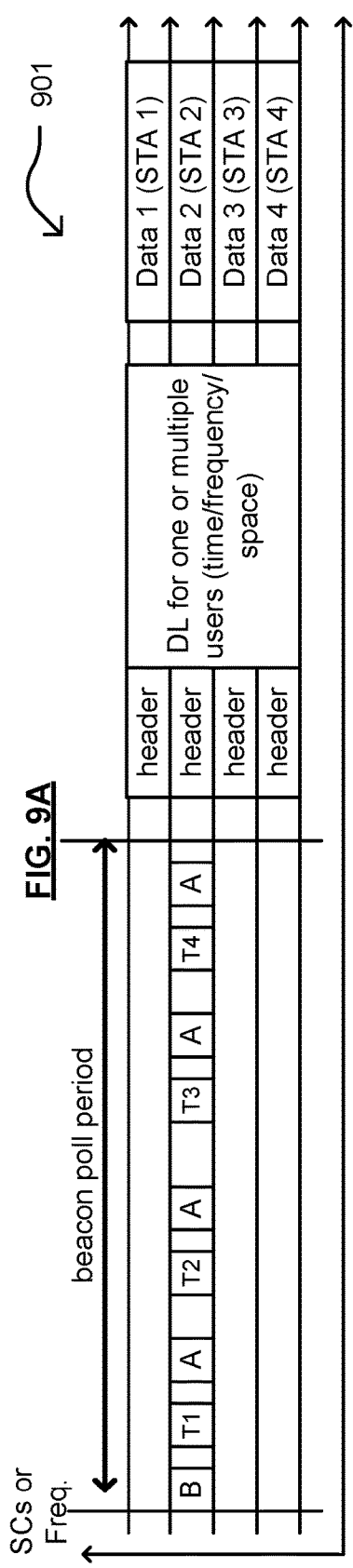
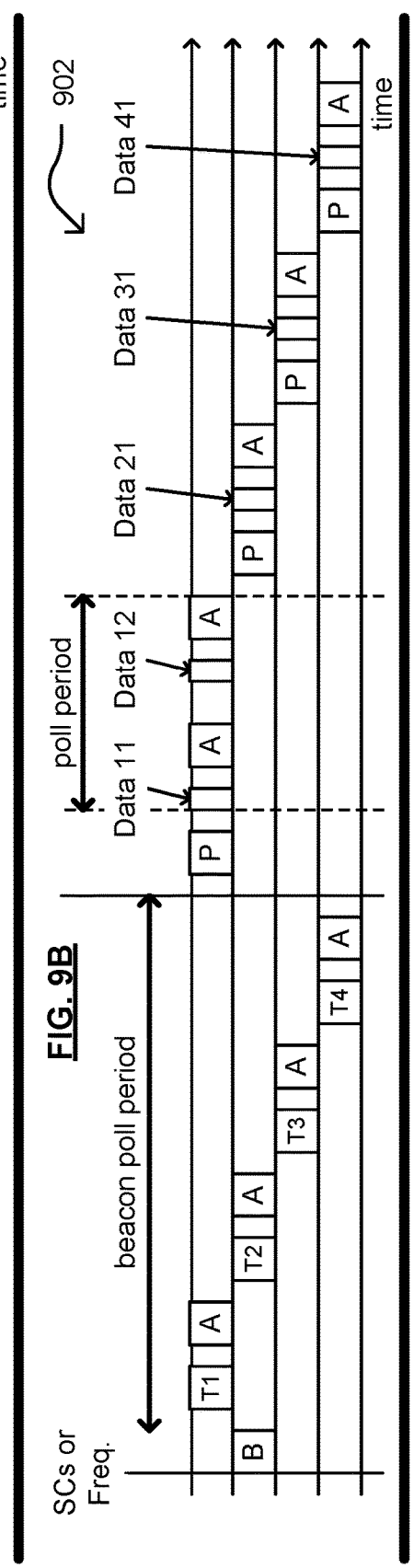
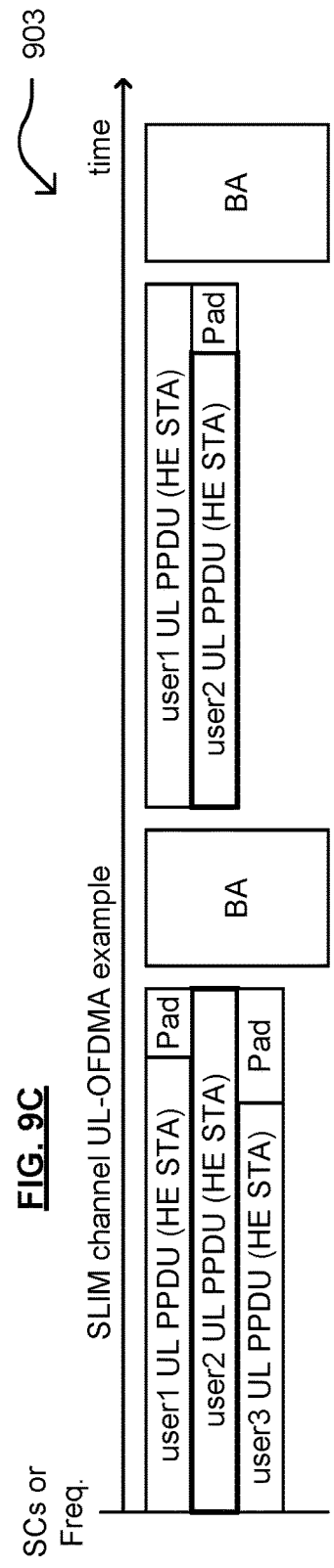
FIG. 9A
FIG. 9B
FIG. 9C

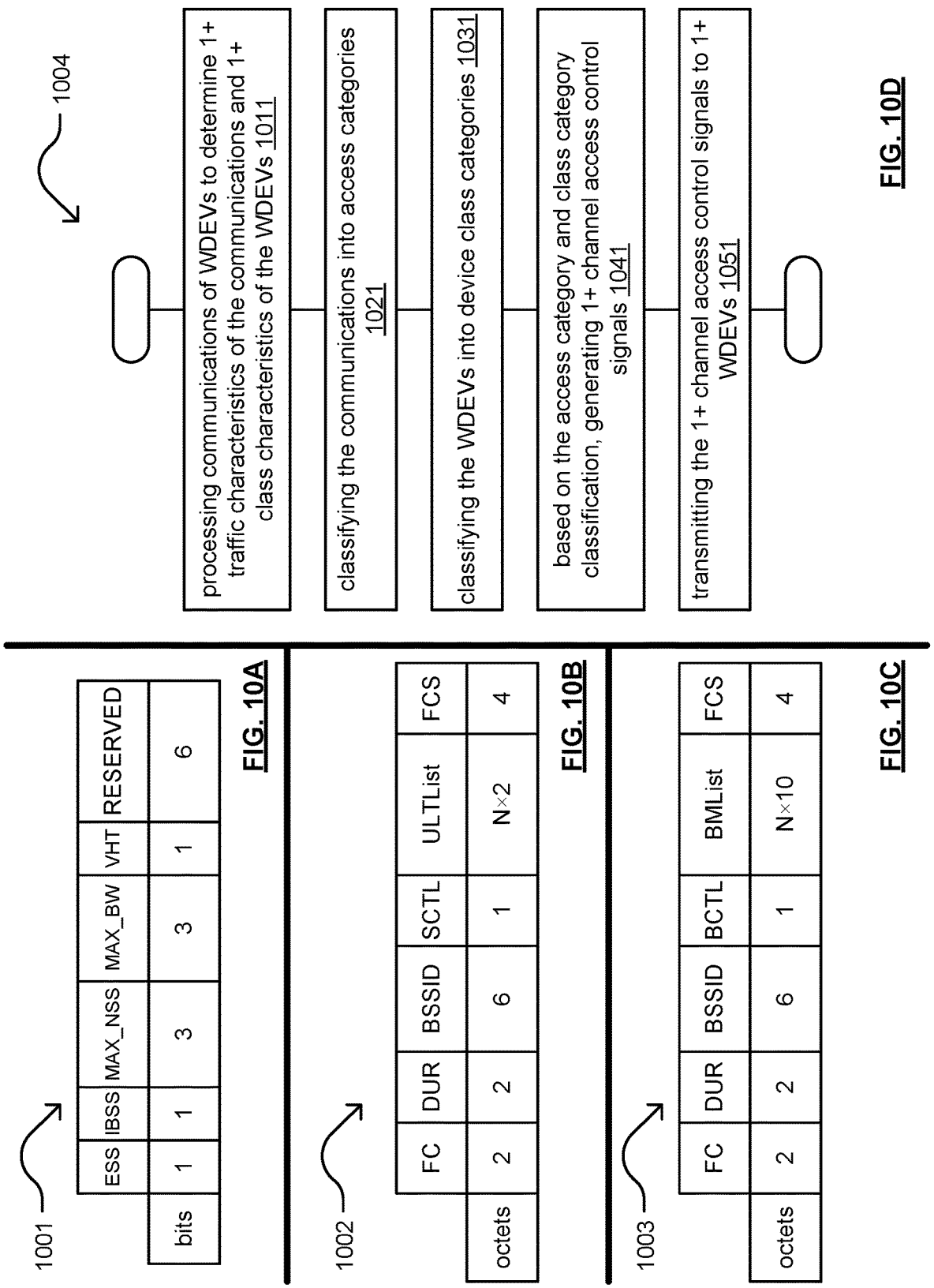

MULTIPLE NARROW BANDWIDTH CHANNEL ACCESS AND MAC OPERATION WITHIN WIRELESS COMMUNICATIONS

CROSS REFERENCE TO RELATED PATENTS/PATENT APPLICATIONS

Cross Reference to Related Patents

The present U.S. Utility patent application claims priority pursuant to 35 U.S.C. §120 as a continuation of U.S. Utility application Ser. No. 14/252,646, entitled "Multiple narrow bandwidth channel access and MAC operation within wireless communications," filed Apr. 14, 2014, issuing as U.S. Pat. No. 9,712,231 on Jul. 18, 2017, which claims priority pursuant to 35 U.S.C. §119(e) to U.S. Provisional Application No. 61/811,861, entitled "Multiple narrow bandwidth channel access within single user, multiple user, multiple access, and/or MIMO wireless communications," filed Apr. 15, 2013; U.S. Provisional Patent Application Ser. No. 61/834,240, entitled "Media access control (MAC) for high efficiency wireless communications," filed Jun. 12, 2013; and U.S. Provisional Patent Application Ser. No. 61/973,361, entitled "Multiple narrow bandwidth channel access and MAC operation within wireless communications," filed Apr. 1, 2014, all of which are hereby incorporated herein by reference in their entirety and made part of the present U.S. Utility patent application for all purposes.

BACKGROUND

Technical Field

The present disclosure relates generally to communication systems; and, more particularly, to channel access and media access control (MAC) control within single user, multiple user, multiple access, and/or MIMO wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths. Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Some recent efforts in wireless communication system development have been geared to increase the number of devices that can effectively operate together. However, the present art does not provide very effective means for coordinated and efficient access to the communication channel among the many devices. Available system resources are not provisioned effectively leading to reduction in overall system throughput as well as individual device operation.

BRIEF DESCRIPTION OF THE SEVERAL VIEWS OF THE DRAWINGS

FIG. 3A is a diagram illustrating an example of communication between wireless communication devices.

FIG. 3B is a diagram illustrating another example of communication between wireless communication devices.

FIG. 3C is a diagram illustrating another example of communication between wireless communication devices.

FIG. 3D is a diagram illustrating another example of communication between wireless communication devices.

FIG. 4A is a diagram illustrating an example of orthogonal frequency division multiplexing (OFDM) and/or orthogonal frequency division multiple access (OFDMA).

FIG. 4B is a diagram illustrating another example of OFDM and/or OFDMA.

FIG. 4C is a diagram illustrating another example of OFDM and/or OFDMA.

FIG. 5A is a diagram illustrating an example of partitioning of sub-carriers or a frequency range/band into a number of channels.

FIG. 5B is a diagram illustrating an example of partitioning of a channel into a number of sub-channels.

FIG. 5C is a diagram illustrating an example of partitioning of channels respectively into different numbers of sub-channels or different widths.

FIG. 5D is a diagram illustrating an example of partitioning of some channels respectively into different numbers of sub-channels or different widths while not partitioning at least one channel.

FIG. 7A is a diagram illustrating an example of downlink (DL) orthogonal frequency division multiple access (OFDMA) signaling for a wireless station (STA) receiving on full bandwidth (BW).

FIG. 7B is a diagram illustrating an example of DL OFDMA signaling for a STA receiving on full BW.

FIG. 7C is a diagram illustrating an example of DL OFDMA signaling for a STA receiving on narrow BW channel.

FIG. 8A is a diagram illustrating an example of DL OFDMA response and protection.

FIG. 8B is a diagram illustrating an example of DL OFDMA response negotiation.

FIG. 8C is a diagram illustrating an example of polling for multiple user (MU) transmissions.

FIG. 9A is a diagram illustrating another example of polling for MU transmissions.

FIG. 9B is a diagram illustrating an example of polling for single user (SU) transmissions.

FIG. 9C is a diagram illustrating an example of slim bandwidth (BW) channel support.

FIG. 10A is a diagram illustrating an example of a new capability (NCAP) field for a super short beacon.

FIG. 10B is a diagram illustrating an example of an uplink (UL) synchronization (Synch) frame.

FIG. 10C is a diagram illustrating an example of multicast block acknowledgement (BACK) for responding to UL OFDMA.

FIG. 10D is a diagram illustrating an embodiment of a method for execution by one or more wireless communication devices.

DETAILED DESCRIPTION

Figure 1:
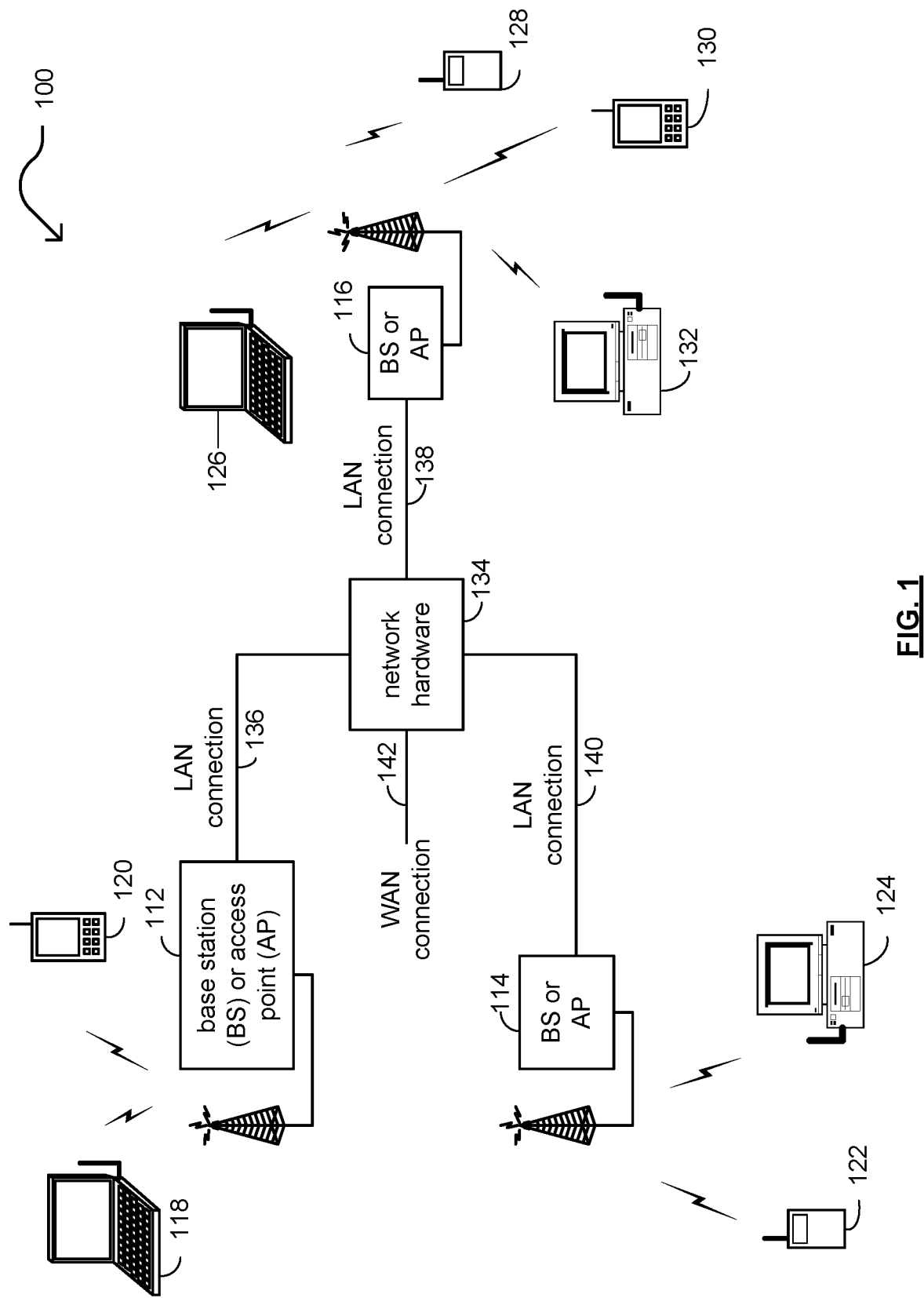
FIG. 1 is a diagram illustrating an embodiment of a wireless communication system.

FIG. 1 is a diagram illustrating one or more embodiments of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and a communication interface to support communications with any other of the wireless communication devices 118-132 and BSs or APs 112-116. In an example of operation, a processor implemented within one of the devices (e.g., any one of the WDEVs 118-132 and BSs or APs 112-116) is configured to process one or more signals received from and/or to generate one or more signals to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2 below, "device 210" when referring to "wireless communication device 210" or "WDEV 210," or devices 210-234 when referring to wireless communication devices 210-234; or with respect to FIG. 3 below, use of "device 310" may alternatively be used when referring to wireless communication device 310, or "devices 390 and 391 (or 390-391)" when referring to wireless communication devices 390 and 391 or WDEVs 390 and 391).

Any of the various devices (e.g., WDEVs 118-132 and BSs or APs 112-116) may include a communication interface configured to support communications with other of the devices and may also include a processor configured to process such communications to perform classification of the other devices as well as the type of communications made by those other devices. In an example of operation, a processor is configured to process the communications associated with the other wireless communication devices to determine one or more traffic characteristics of those communications as well as one or more class characteristics of the other wireless communication devices. Then, based on the one or more traffic characteristics, the processor is configured to classify the communications into one or more access categories. Also, based on the one or more class characteristics, the processor is configured to classify the other devices into one or more device class categories. The processor is then configured to generate one or more channel access control signals based on classification of the communications into the access categories and classification of the other wireless communication devices into the device class categories. The communication interface of the device is configured to transmit the one or more channel access control signals to one or more of the other devices. The one or more channel access control signals specify channel access for one or more of the other devices.

In an example of operation, a channel access control signal specifies one or more narrowband sub-channels for use by one or more of the other devices. For example, different 20 MHz channels may be specified within one or more IEEE 802.11 communication protocols. A channel access control signal may specify one or more sub-channels of any one or more of the 20 MHz channels for use by one or more of the other devices. In another example of operation, a channel access control signal specifies one or more backoff parameters and/or one or more enhanced distributed channel access (EDCA) parameters for use by the one or more other devices when accessing the communication medium.

Generally, a device directs communication medium access for other devices based on characterization and classification of the traffic types supported by the other devices as well as the class types of the other devices into one or more access categories. This device then transmits a channel access control signal to the other devices that directs manner by which the other devices access the communication medium.

Figure 2:
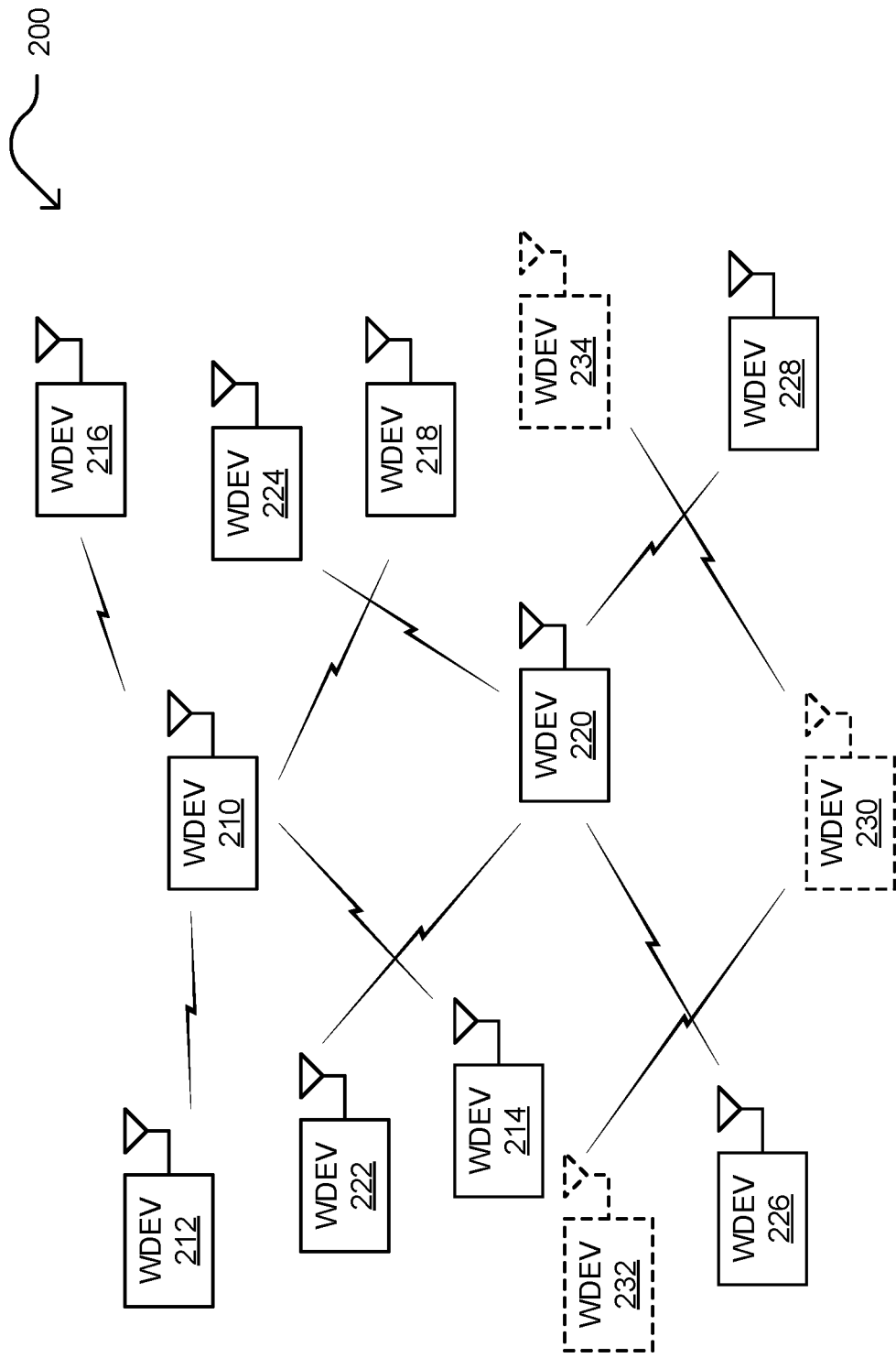
FIG. 2 is a diagram illustrating an embodiment of dense deployment of wireless communication devices.

FIG. 2 is a diagram illustrating an embodiment 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, one or more additional APs or AP-operative STAs may be deployed, such as WDEV 230 that communicates with WDEVs 232 and 234 that are STAs. The STAs may be any type of wireless communication devices such as wireless communication devices 118-132, and the APs or AP-operative STAs may be any type of wireless communication devices such as BSs or APs 112-116. Different groups of the WDEVs 210-234 may be partitioned into different basic services sets (BSSs). In some instances, one or more of the WDEVs 210-234 are included within one or more overlapping basic services sets (OBSSs) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and AP are packed in a given area (e.g., which may be a relatively small area [indoor or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

Any of the devices in this diagram (an AP or AP-operative STA) may be configured to direct communication medium access for other devices (e.g., STAs and/or other APs) based on characterization and classification of the traffic types supported by those other devices as well as the class types of the other devices into one or more access categories. This AP or AP-operative STA device then transmits a channel access control signal to the other devices (e.g., STAs and/or other APs) that directs manner by which the other devices access the communication medium. FIG. 3A is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of one or more frames (e.g., using a transmitter 322 and a receiver 324). The wireless communication device 310 also includes a processor 330, and an associated memory 340, to execute various operations including interpreting one or more frames transmitted to wireless communication device 390 and/or received from the wireless communication device 390 and/or wireless communication device 391. The wireless communication devices 310 and 390 (and/or 391) may be implemented using one or more integrated circuits in accordance with any desired configuration or combination of components, modules, etc. within one or more integrated circuits. Also, the wireless communication devices 310, 390, and 391 may each include more than one antenna for transmitting and receiving of one or more frames (e.g., WDEV 390 may include m antennae, and WDEV 391 may include n antennae).

Communication interface 320 is configured to support communications with devices 390-391 and to transmit at least one channel access control signal to devices 390 and/or 391. The at least one channel access control signal specifies channel access for devices 390 and/or 391. Processor 330 is configured to process the communications associated with devices 390-391 to determine one or more traffic characteristics of those communications and one or more class characteristics of the devices 390-391. Processor 330 is also configured to classify the communications into access categories based on the one or more traffic characteristics and is also configured to classify the wireless communication devices into device class categories based on the one or more class characteristics. Processor 330 is also configured to generate the at least one channel access control signal based on classification of the communications into the access categories and classification of the devices 390-391 into the device class categories. Devices 390 and/or 391 then perform channel access to the communication medium based on the at least one channel access control signal. Different channel access control signals may be transmitted by device 310 for use by devices 390-391 at different times and/or based on different information based on the different channel access control signals.

FIG. 3B is a diagram illustrating another example 302 of communication between wireless communication devices. The communication interface 320 of WDEV 310 is configured to receive a first signal from a first other wireless communication device (e.g., WDEV 390). The processor of WDEV 310 is configured to support communications with devices 390-391. These communications may be unidirectional (e.g., received from the devices 390-391) and/or bidirectional and may be of any desired type (e.g., control signals, management signals, acknowledgment signals, etc.). Device 310 processes those communications associated with devices 390-391 to determine one or more traffic characteristics of the communications and one or more class characteristics of devices 390-391. Device 310 then classifies the communications into plurality of access categories, and classifies devices 390-391 into device class categories. In some instances, communications received from devices 390 and/or 391 include one or more channel requests from 390 and/or 391. Device 310 may be configured to determine efficiency of the communications based on any one or more of modulation coding set (MCS), physical layer (PHY) data rate, media access control (MAC) data rate, and channel bandwidth of the communications. Device 310 may then generate the at least one channel access control signal to indicate one or more enhanced distributed channel access (EDCA) parameters that are based on the efficiency of the communications and one or more of the access categories for use by devices 390 and/or 391 to support subsequent communications with device 310.

FIG. 3C is a diagram illustrating another example 303 of communication between wireless communication devices. Based on the classification of access categories and device class categories, device 310 generates one or more channel access control signals that specify/specifies channel access for devices 390-391. The one or more channel access control signals may specify one or more narrowband channels for each of devices 390-391, one or more backoff parameters and/or one or more EDCA parameters for channel access, an override of any one or more default parameters, etc. Device 310 then transmits the one or more channel access control signals to devices 390 and/or 391.

An AP may operate to indicate backoff parameters and/or modified backoff parameters for use by STAs in the system. An AP may be configured to transmit an extended enhanced distributed channel access (EDCA) parameter information element (e.g., a new information element, included within a MAC body of a MAC frame). An original EDCA parameter information element indicates EDCA parameters to be used for each access category (e.g., AC_BE (best effort), AC_VI (video), AC_VO (voice), AC_BK (background) (e.g., CWMIN, CWMAX, AIFSN, TXOPLimit)). In EDCA, the levels of priority may be referred to as access categories (ACs). The contention window (CW) can be set according to the traffic expected in each access category, with a wider window needed for categories with heavier traffic. The CWmin and CWmax values are calculated from aCWmin and aCWmax values, respectively, that are defined for each physical layer supported by IEEE 802.11e. In some examples, various access categories may include one or more of voice access category, video access category, best effort access category, and background access category. In some examples, various device class categories may include one or more of a first class device category that includes at least one communication device permitted to communicate within one or more restricted access windows (RAWs) but at no other time, a second class device category that includes at least one communication device prohibited to communicate within the one or more RAWs but permitted to communicate during at least one additional time, and/or a third class device category that includes at least one communication device permitted to communicate within the one or more RAWs and also during the at least one additional time.

The Extended EDCA Parameter information element indicates EDCA parameters for use depending on efficiency of pending transmission. The efficiency of any (pending) transmission may be determined by examining any combination of the following: MCS to be used for pending transmission, Raw PHY Rate (RPR) to be used for pending transmission, MAC Throughput Mbps value (MTM), expected for pending transmission, and/or Bandwidth of pending transmission.

An AP may indicate to STA(s) to combine traffic class of pending transmission (e.g., AC_BE) with efficiency rating of any pending transmission to determine a set of EDCA parameters to be used for other transmissions. For example, the Extended EDCA parameters expressed by AP may serve as a relative modification to an access category based on EDCA parameters. As another example, if a pending transmission is AC_BE, then the Extended EDCA Parameters indicate an increase of AIFSN+2 and increase of CWMIN+ 15 for efficiency between 12.0 and 26.0 Mbps. Alternatively, an AP may indicate to a STA to override access category EDCA parameters with EDCA parameters based on the efficiency rating of pending transmission. For example, Extended EDCA parameters replace original EDCA parameters for efficiency between 1.0 Mbps and 12.0 Mbps. An AP may indicate a combination such that, below a certain efficiency, override of access category parameters is in effect, whereas above that efficiency, another set of access category parameters is used, or a combination of both is used. For a mixture of PPDUs with differing efficiencies within a single TXOP, a STA may use the highest efficiency PPDU of the TXOP to determine the EDCA parameters to use.

Parallel queues at the same existing EDCA Quality of Service (QoS) Class may also exist. For example, parallel AC_VI queues with different Extended EDCA Parameters may be applied on top of the base EDCA Parameters. These multiple parallel queues compete with each other within a single MAC just as the existing EDCA queues already compete with each other.

FIG. 3D is a diagram illustrating another example 304 of communication between wireless communication devices. Based on the received channel access control signals, device 390 and/or 391 can acquire access to one or more subchannels within one or more channels and make at least one transmission to other DEVs in the system (e.g., from device 390 to devices 310 and/or 391, from device 391 to devices 310 and/or 390), etc.

FIG. 4A is a diagram illustrating an example 401 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and frames. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor of a communication device may be configured to perform forward error correction (FEC) and/or error correction code (ECC) of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, etc. The one or more coded bits may then undergo modulation or symbol mapping to generate modulation symbols. The modulation symbols may include data intended for one or more recipient devices. Note that such modulation symbol may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 4B is a diagram illustrating another example 402 of OFDM and/or OFDMA. A transmitting device transmits modulation symbols via the sub-carriers. OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a CP (Cyclic Prefix) and/or cyclic suffix (CS) (shown in right hand side of FIG. 4A) that may be a copy of the CP may also be employed within the guard interval to allow switching time, such as when jumping to a new communication channel or sub-channel, and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM frames are transmitted between a transmitter device and a receiver device, all of the sub-carriers or tones are dedicated for use in transmitting modulated data between the transmitter and receiver devices. In a multiple user system in which one or more OFDM symbols or OFDM frames are transmitted between a transmitter device and multiple recipient or receiver devices, the various sub-carriers or tones may be mapped to different respective receiver devices as described below with respect to FIG. 4C.

FIG. 4C is a diagram illustrating another example 403 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first frame, a second assignment for second frame, etc.). Note that in a multiple user (MU) application, the sub-carrier(s)/tone(s) can be assigned as contiguous and different groups for different respective users, or alternatively, inter-mingled among one another as shown in the diagram.

An OFDM frame may include more than one OFDM symbol. Similarly, an OFDMA frame may include more than one OFDMA symbol. In addition, such sub-carrier/tone assignment may be dynamic among different respective symbols within a given frame or superframe (e.g., a first assignment for a first OFDMA symbol within a frame, a second assignment for a second OFDMA symbol within the frame, etc.). Generally speaking, an OFDMA symbol is a particular type of OFDM symbol, and general reference to OFDM symbol herein includes both OFDM and OFDMA symbols (and general reference to OFDM frame herein includes both OFDM and OFDMA frames).

Generally, a communication device may be configured to include a processor configured to process received OFDM or OFDMA symbols and/or frames and to generate such OFDM or OFDMA symbols and/or frames. The processor of the communication device is configured to generate such symbols and/or frames for transmission and interpret such symbols and/or frames received from other devices. Note that any of the communications made between devices (e.g., AP-STA, STA-AP, STA-STA) can be made via OFDM and/or OFDMA signaling as described herein. For example, a device may use communications received via OFDM and/or OFDMA signaling to determine one or more traffic characteristics and one or more class characteristics of the other wireless communication devices. The device may then classify the communications into access categories based on the one or more traffic characteristics and classify the other wireless communication devices into device class categories based on the one or more class characteristics.

FIG. 5A is a diagram illustrating an example 501 of partitioning of sub-carriers or a frequency range/band into a number of channels. A number of sub-carriers, frequency range, or frequency band is divided into a number of channels, n, of uniform bandwidth in this diagram. A channel access control signal may specify any one or more of these channels for use by one or more other devices at various times.

FIG. 5B is a diagram illustrating an example 502 of partitioning of a channel into a number of sub-channels. A channel that is composed of a particular contiguous set of sub-carriers, frequency range, or frequency band is further divided, i.e., sub-divided, into a number of sub-channels, x, of uniform bandwidth in this diagram. In this example, channel (CH) 1 is subdivided into x sub-channels each having the same bandwidth (e.g., sub-channel (sub-CH) 1,1; sub-CH 1,2; sub-CH 1,3; and so on up to sub-CH 1,x). A channel access control signal may specify any one or more of these sub-channels for use by one or more other devices at various times.

FIG. 5C is a diagram illustrating an example 503 of partitioning of channels respectively into different numbers of sub-channels or different widths. Different channels are sub-divided differently such that each channel does not necessarily have the same number of sub-channels therein, and the sub-channels within different channels are of different bandwidths. For example, CH 1 is subdivided into x sub-channels each having a first bandwidth (e.g., sub-CH 1,1; sub-CH 1,2; sub-CH 1,3; and so on up to sub-CH 1,x), and CH 2 is subdivided into y sub-channels each having the a second bandwidth (e.g., sub-CH 2,1; sub-CH 2,2; and so on up to sub-CH 2,y). The sub-channels within CH 1 and the sub-channels within CH 2 have different bandwidths. Within each channel, the sub-channels therein are of uniform bandwidth, but they are not necessarily the same bandwidth as sub-channels within other channels.

FIG. 5D is a diagram illustrating an example 504 of partitioning of some channels respectively into different numbers of sub-channels or different widths while not partitioning at least one channel. In this diagram, different channels are sub-divided differently such that each channel does not necessarily have the same number of sub-channels therein, and at least one of the channels is not subdivided in the sub-channels (e.g., CH 2). CH 1 is subdivided into x sub-channels each having a first bandwidth (e.g., sub-CH 1,1; sub-CH 1,2; and so on up to sub-CH 1,x), and CH 3 is subdivided into z sub-channels each having the a second bandwidth (e.g., sub-CH 3,1 and so on up to sub-CH 3,z).

In a wide bandwidth (BW) basic services set (BSS), some wireless communication devices (e.g., wireless stations (STAs)) may operate by using narrow bandwidth (BW) channel(s) to communicate with one or more peer STAs. For example, legacy STAs may be able only to support narrow BW channels. Some STAs be configured to modify transmitter (TX) power on a narrow BW channel to communicate over longer distances. Some STAs may operate by narrowing down receive or receiver (RX) BW to avoid adjacent channel interference. Another wireless communication device (e.g., an Access point (AP)) may provide frequency/channel diversity in the system by using/assigning different narrow BW channels to different STAs.

Note that certain IEEE 802.11 specifications (alternatively referred to herein as merely 802.11, 802.11 spec, etc.) require that all transmissions include the 'primary channel' (i.e., a specification-identified channel, often having 20 MHz BW). Within a BSS, all STAs then operate by sharing the usage of the primary 20 MHz channel. An AP may be configured to assign different narrow BW channels among all accessible channels to the STAs for best utilization of frequency resource.

The dense deployment of wireless communication devices in this diagram may operate based on High Efficient Channel Access (HECA), which is built upon legacy 802.11 channel access protocols (LCA) (e.g., enhanced distributed channel access (EDCA), network allocation vector (NAV), and high throughput/very high throughput (HT/VHT) multi-channel access protocols). In HECA, legacy STAs will operate using LCA. High Efficient (HE) STAs may use LCA by default, e.g. during pre-association and/or association stages, until being disallowed to use LCA any further, and/or HE STAs may be allowed or disallowed to use LCA under certain conditions.

HECA enables multiple STAs to transmit and/or receive data at different channels 1) simultaneously, and/or; 2) at non-overlapped time periods, and/or; 3) at partially overlapped time periods. HECA enables at least one of the HE STAs to transmit and/or receive on 1) a non-primary channel, and/or; 2) a channel set excluding the primary channel, and/or 3) a sub-channel of the primary channel.

A High Efficient (HE) AP may signal the channel assignments to the HE STAs (e.g., via a channel access control signal) for transmitting and/or receiving by using any of the following: certain PHY/MAC header fields (e.g., preamble signal field (SIG)), certain control frames (e.g., such as multi-user poll frame), and/or certain management frames (e.g., beacon, association, or special channel assignment frames, or OFDMA grouping frames).

HE STAs may be allowed to use HECA for transmitting and/or receiving only under certain conditions; for example, right after explicit signaling from the AP, and/or within certain time periods; and/or HE STAs may be disallowed to use HECA under certain conditions. A HE AP may be configured to allow HE STAs to use LCA only within certain time period(s) (e.g., certain time duration after each beacon/DTIM beacon); and/or HE AP may disallow HE STAs to use LCA within certain time period(s). HE AP may allow HE STAs to use LCA only for certain transmissions (e.g., HE STAs can only use LCA to transmit uplink buffer status and/or uplink resource request frames; and/or HE STAs may only use LCA to transmit high priority frames).

For HECA downlink transmissions, a HE AP may be configured to transmit simultaneously to two or more STAs on different channels (e.g., where one receiving STA may be a legacy STA). The HE AP can use a valid legacy channel set to transmit to the legacy STA, and use other channels to transmit to HE STAs.

A HE STA that is capable of receiving and transmitting on all operating channels may be informed of the downlink transmission channel via any of the following: via the PHY header/preamble fields of the downlink frames (on the fly), and/or; via an advanced notification, such as pre-transmission channel negotiation/protection, and/or channel/OFDMA group assignment etc.

A HE STA that is operative to receive and/or transmit on all operating channels may be assigned one operating channel in advance. This HE STA should switch to the assigned channel permanently or most of the time for receiving and/or transmitting. If the HE STA wants to use LCA to access the primary channel occasionally or periodically, e.g. to transmit an uplink resource request, it should ensure that the AP shall not transmit any downlink frame to it on the assigned channel before it switches back to the assigned channel.

Also, a HE AP may poll and/or schedule multiple STAs to transmit on different channels simultaneously. A HE STA may be restricted to transmit on an assigned channel (other than a valid legacy channel set) only under specific conditions, such as: it receives an individual poll frame for uplink transmissions; and/or it receives a multi-user poll frame for uplink transmissions; and/or it was scheduled for uplink transmissions within a time period.

For polling based uplink transmissions, an AP may transmit one or more poll frames to elicit uplink transmission(s) from one or more STAs, with the polled uplink transmissions limited to the following: one or more uplink transmitters or transmitter groups; and/or transmissions on certain frequency channel(s) per polled transmitter; and/or one or a certain number of uplink transmission(s) per polling (e.g., a poll frame can provide a schedule for one or more uplink transmissions with starting time and transmission duration for each polled transmission); and/or one or more polling time periods containing the uplink transmissions; and/or certain uplink channel access method(s) (e.g., certain delay (say SIFS/PIFS) after the poll frame, scheduled (e.g. slotted) transmission(s), random channel access with certain EDCA priority, channel access with certain CCA threshold(s); and/or certain transmission types, such as certain frame type(s) and/or high priority transmissions only).

The poll frame can be a control frame that carries address/AID list of the polled STAs, and/or a multi-user group ID that identifies the polled STAs; it may also include the polling restrictions as mentioned above; and/or it can be a management frame, such as a beacon frame. The poll frame can serve both purposes of: 1) poll for uplink resource requests; 2) trigger uplink data transmissions.

The poll frame may be transmitted on all channels that the polled transmissions may be present; and/or it may be transmitted on one particular channel, such as the primary channel. Referring again to FIG. 5A, FIG. 5B, FIG. 5C, and FIG. 5D, various embodiments may operate using narrow bandwidth channels and/or sub-channels. For example, consider an AP operative at both 2.4 GHz and 5 GHz bands (e.g., frequency bands as specified in certain IEEE 802.11 communication protocols).

At 5 GHz band, an AP can operate at a wide bandwidth (BW) (e.g., 80 MHz) operating channel and pick a 20 MHz sub-channel as the primary channel. AP can decide to assign one or more valid 20/40/80 MHz (primary or secondary) channels within this 80 MHz operating channel to a STA. AP can further divide each 20 MHz channel to 5/10 (e.g., 5 and/or 10) MHz sub-channels and assign one or more 5/10 MHz sub-channels to a STA. The AP can also divide one 20 MHz channel to 5/10 MHz sub-channels (e.g. divide the primary 20 MHz channel only, and/or choose a 20 MHz channel with minimum co-channel interference and/or adjacent channel interference). In addition to 80 MHz "primary" operation channel, the AP can also claim one or more "alternate" 20/40/80 operating channels. The AP can assign one or more 5/10/20/40/80 (e.g., 5, 10, 20, 40 and/or 80) MHz sub-channels from within the alternate operating channels to a STA. The AP can use OFDMA signaling to communicate with two or more STAs within the primary operating channel or one of the alternate operating channels, and the AP can switch to different operating channels at different time periods.

At 2.4 GHz band, the AP can choose a primary 20/40 (e.g., 20 or 40) MHz operating channel and one or two "alternate" operating channels and assign one or more 20/40 MHz channels from within the operating channels to a STA. The AP can divide one or more 20 MHz operating channel to 5/10 MHz sub-channels and assign one or more of such sub-channels to a STA. The AP can also claim the 5 MHz channel(s) between the 3 non-overlapped 20 MHz channels as "alternate" operating channels, and assign one or more such channels to a STA.

Figure 6:
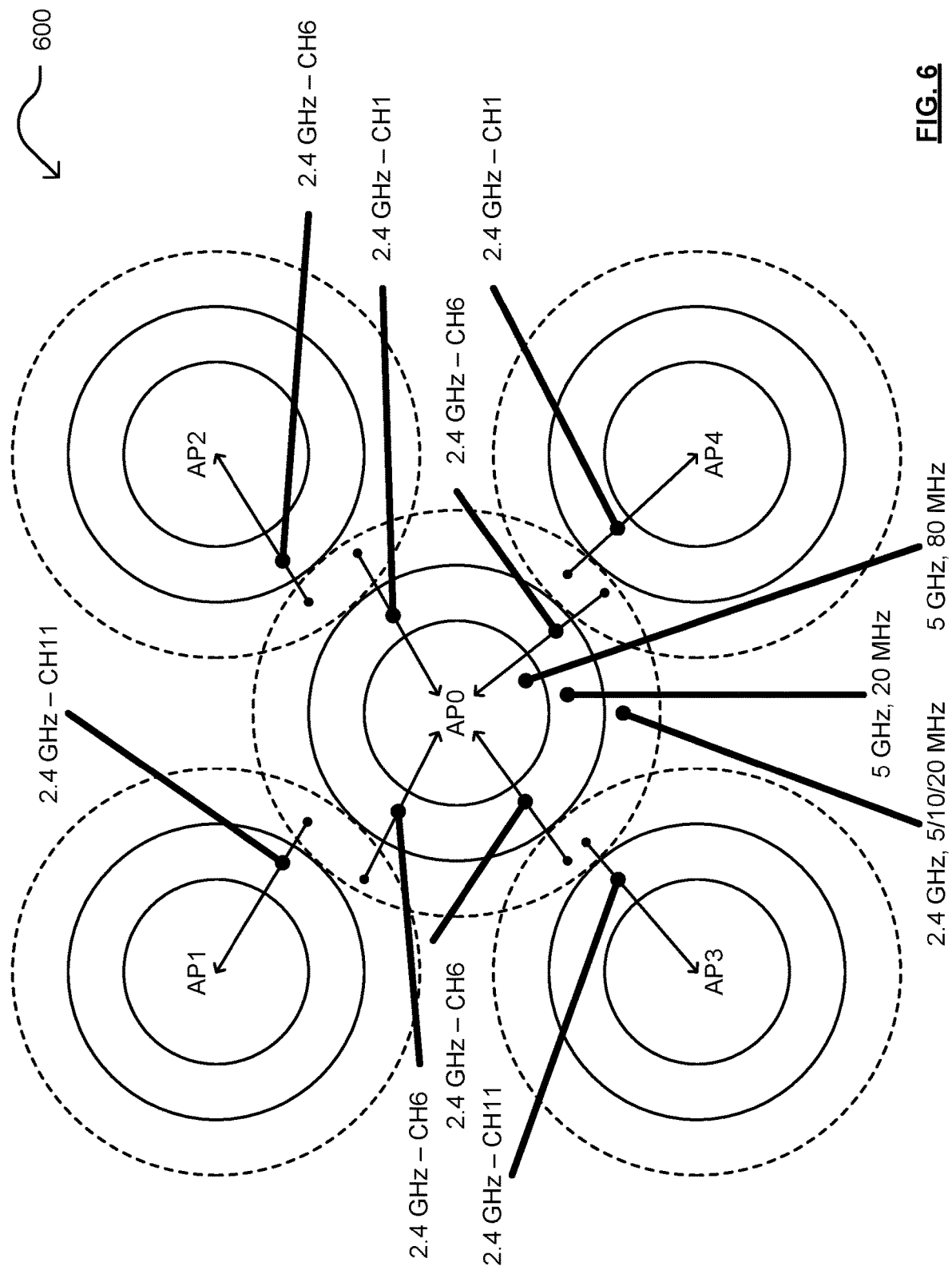
FIG. 6 is a diagram illustrating an example of narrow channel usage within a wireless communication system.

FIG. 6 is a diagram illustrating an example 600 of narrow channel usage within a wireless communication system. In an AP oriented application, an AP measures the link quality of communication pathways to each STA on each or certain narrow/wide BW channels (e.g. by measuring packet error rate (PER), uplink (UL) frame quality, link adaptation feedback, or using beamforming sounding), and also measures the interference level on each or certain narrow/wide BW channels. Based on the measurements, as well as other BSS conditions (such as existing STA conditions on each narrow/wide BW channel), the AP selects the BW and position of the operating channel for each STA, and assigns the channel to the STA. AP may keep monitoring the link quality and channel condition, and change channel assignment accordingly.

In a STA-oriented application, each STA measures the link quality to AP on each or certain narrow/wide BW channels. Each STA also measures the interference level on each or certain narrow/wide BW channels. Based on the measurements, a STA decides the BW and position of the operating channel (among AP's operating channels or capable channels), and request the channel from the AP. The AP can assign the requested channel to the STA, or reject the request (e.g. the STA will need to stay at the primary channel), or suggest a different channel based on the BSS conditions.

In an AP-STA negotiated application, both AP and STA measures link quality based on exchanged frames, beamforming sounding, and/or special channel sounding process on each or certain narrow/wide BW channels. Both AP and STA measure the interference conditions on each or certain narrow/wide BW channels. STA feedbacks measurement or suggested operating channel to AP. AP makes channel assignment decision based on STA's feedback, its own measurement, and the current BSS conditions, and assigns the channel to the STA. AP/STA may continue monitoring the link quality/channel conditions and change channel accordingly.

FIG. 7A is a diagram illustrating an example 701 of downlink (DL) orthogonal frequency division multiple access (OFDMA) signaling for a wireless station (STA) receiving on full bandwidth (BW). In one example of operation, a DL OFDMA packet can be a full-BW packet but with certain bits modified in one of the SIG fields therein. The DL OFDMA packet can include a new/modified preamble so that HE STAs can detect an OFDMA frame and know which part of the frequency band is for their use. Non-HE STA may check the legacy preamble on the primary channel to find out the BW for the downlink frame. Each HE STA may be configured to check both the legacy preamble on the primary channel, as well as the HE preamble on at least one of the non-primary channels to figure out the channel/BW/tone assignment. A DL OFDMA packet may then be sent with same rules as any other full-BW packet.

FIG. 7B is a diagram illustrating an example 702 of DL OFDMA signaling for a STA receiving on full BW. If some of the operating channels are busy, HE AP may send a DL OFDMA packet by skipping over/excluding those busy channels. HE AP may assign an arbitrary number of tones to each HE STA. Note that the tones assigned to a HE STA do not need to be contiguous; different HE STAs may be assigned different number of tones (e.g., contiguous sets, inter-mingled and/or interspersed sets, etc.). For example, tone assignment can be signaled in preamble and/or an advanced signal frame.

FIG. 7C is a diagram illustrating an example 703 of DL OFDMA signaling for a STA receiving on narrow BW channel. STAs may be configured to switch to the assigned channels after LCA period, and HE AP can make use of downlink OFDMA to transmit multiple frames to multiple STAs simultaneously. Since each STA decodes its own sub-PLCP Protocol Data Unit (PPDU) on its assigned channel, different sub-PPDUs in a same DL-OFDMA PPDU can have different/independent formats from each other, as shown in the figure. All sub-PPDUs can be padded to the same PPDU duration.

FIG. 8A is a diagram illustrating an example 801 of DL OFDMA response and protection. A Clear to Send (CTS)-to-Self transmission can be used before the DL-OFDMA transmission to protect the whole sequence. An AP may be configured to allow one STA to transmit an immediate response after the DL-OFDMA transmission, especially if the sequence was protected by CTS-to-Self. AP may poll the remaining STAs one-by-one for responses as shown in the figure. AP may duplicate the response polling frame on all channels for various purposes including: (1) protecting the polled response from adjacent channel interference and (2) protecting the remaining response sequence. For more protection of the first response, the AP may transmit a response polling frame right after the DL-OFDMA transmission to poll the first response also. HE STAs may transmit their BAs only on the channels where they receive the downlink frames; and/or HE STAs may always duplicate their BAs on all operating channels. An AP capable of UL-OFDMA can also poll all HE STAs to send responses simultaneously. If a legacy STA is included in the DL-OFDMA transmission, a response from the legacy STA can be scheduled to be immediately followed the DL-OFDMA transmission, or be polled separately.

FIG. 8B is a diagram illustrating an example 802 of DL OFDMA response negotiation. Before a DL-OFDMA transmission, the AP may send a Request-to-Send (RTS) to all intended receivers to probe receiver-side medium conditions. This may be performed using one of the following options: (Option 1) RTSs to different receivers are independent from each other and each carries the intended receiver's MAC address or (Option 2) a same RTS frame is duplicated on all channels and the RTS carries the intended receivers' OFDMA group ID and the legacy STA's (if any) MAC address.

An intended receiver may be configured to transmit a CTS on its assigned channel if it receives a RTS that carries its MAC address or one of its assigned OFDMA group IDs and/or if the medium is sufficiently idled (e.g. for PCF inter-frame space (PIFS)) before receiving the RTS. The AP may be configured to monitor all RTS-sending channels to check whether there is a CTS signal returned on any of the channels. AP starts DL transmissions only on the channels where CTS signals are detected and also the channels should form a valid OFDMA channel sets (such as primary 20/40/80, secondary 20/40, etc.).

FIG. 8C is a diagram illustrating an example 803 of polling for multiple user (MU) transmissions. In this example, the AP transmits a beacon frame to indicate the start of a first polling period to collect uplink pending data information from STA(s). The beacon can signal the duration of the poll period and the identifications of the STAs/STA groups that are allowed to transmit during the poll period. Uplink transmissions during this poll period may be limited to the following: (1) very short trigger frames (with STAs' uplink pending data information) and/or (2) transmissions on primary channel only or at least including the primary channel. The AP may either schedule uplink transmissions for the STA group(s) in the time domain (e.g. assigning a slot for each STA/STA group). The AP may also allow STAs to access channel by using random channel access but with highest priority (e.g., shortest backoff delay). The AP may protect the poll period by disallowing member STAs other than those STAs that have been polled to transmit during the poll period. The AP may also use a beacon (and/or a protection frame transmitted before or after the beacon frame) to set network allocation vector (NAV) on adjacent non-member STAs to protect partial or whole poll period. After the AP collects the uplink pending data information, the AP can transmit a multi-user poll frame to initiate multi-user uplink transmissions in the frequency and/or space domains. Typically, the polled uplink transmissions are required to start SIFS after the poll frame.

The multi-user poll frame may carry an identification of STAs being polled (e.g., a group ID (or multiple group IDs) representing the STAs being polled. A multi-user poll frame may also carry an address/association ID (AID) list or bitmap indicating the STAs being polled. A multi-user poll frame may also carry physical layer (PHY) parameters of the polled transmissions (e.g., transmission channel(s), transmission power, stream numbers, MCS, coding such as BCC/LDPC, short/long guard interval (SGI/LGI), etc. for each polled STA). A multi-user poll frame may also carry poll duration that confines all polled uplink transmissions, and/or a protection duration that sets NAV to protect all polled uplink transmissions or the whole polling sequence. The poll frame may be transmitted in each involved legacy unit channel (e.g. 20 MHz in the IEEE 802.11 specification) for better protection on the polled uplink transmissions.

Also, an AP may use the block ACK/acknowledgement (BA/ACK) frames for the previous uplink transmissions to poll the next uplink transmissions. The AP can provide a simple indication in a BA/ACK to poll the same STA to continue uplink transmission using the same polling parameters as indicated in the first poll frame. A BA/ACK mechanism can also carry partial or full polling information included in the first multi-user poll frame (as specified in the previous slide) in order to poll a different STA group or change the uplink transmission parameters. BA/ACK may also carry some special PHY parameters to poll retransmissions, such as HARQ parameters. To reduce overhead, the polled uplink transmissions may use a shortened PHY and/or MAC headers.

FIG. 9A is a diagram illustrating another example 901 of polling for MU transmissions. To improve efficiency, an AP may include polling information in the PHY/MAC header and/or special field/sub-frame at the beginning of one or more downlink frames. The polled STAs may start uplink transmissions right after the downlink frame that carries the polling information, and/or start uplink transmissions at one or more indicated time periods.

FIG. 9B is a diagram illustrating an example 902 of polling for single user (SU) transmissions. In some instances, an assumption may be made that an AP may assign a narrowband channel for a STA to transmit and receive. The AP can collect the uplink pending data information during the beacon poll period using any of the various options: (Option 1) a beacon (B) is only transmitted on the primary channel such that STAs may be required to switch to the primary channel during the beacon poll period to transmit trigger frames; (Option 2) a beacon is only transmitted on the primary channel such that STAs open up receivers on the whole operation bandwidth during the beacon poll period, but transmit trigger frames only on the assigned channels; or (Option 3) a beacon is transmitted on all assigned channels; STAs may receive on the assigned channels only and transmit trigger frames only on the assigned channels.

FIG. 9C is a diagram illustrating an example 903 of slim bandwidth (BW) channel support. The Poll frame is transmitted by using the legacy unit channel and legacy frame format to poll uplink transmissions on the slim BW channels and also to provide NAV protection on the subsequent transmissions. The poll frame includes the address/ID of the intended STAs or a group ID of an OFDMA group. When receiving the uplink transmissions correctly, the AP transmits response frame(s) that acknowledge the received frames from all intended STAs. The response frame is transmitted on the legacy unit channel and also serves as the poll and protection frame for subsequent transmissions. To maintain STA side protection for downlink communications, an AP may be configured to transmit request to send (RTS) on the legacy unit channel. A STA then transmits a clear to send (CTS) also on the legacy unit channel.

A HE AP (e.g., operative based on HECA) may be configured to provide one or more channel access control signals to STAs (or other APs in the communication system) to limit access for certain STAs (e.g., a STA operating at low MCS and/or low BW) to limit their impact. Such a HE AP may also be configured to indicate modified backoff parameters for the various STAs (e.g., for those STAs having relatively low BW operation and/or low MCS operation, including backoff parameters per MAC Throughput Mbps value (MTM) or Low Raw PHY Rate (RPR) or Low MCS).

FIG. 10A is a diagram illustrating an example 1001 of a new capability (NCAP) field for a super short beacon. A New Capability (NCAP) field can be employed for Super Short Beacon (e.g., used in any of the examples herein that include beaconing). In some instances, the following capabilities are indicated by the presence of the Super Short Beacon (SSB): Privacy, Short preamble, Spectrum management, Quality of Service (QoS), Short Slot, automatic power save delivery (APSD), Radio Measurement, Immediate Block ACK, etc. Also, the following capabilities can be indicated by the presence of the SSB: complementary code keying (CCK), 1,2, 5.5., 11 Mbps Rates, Extended Rate PHY (ERP), ALL Mandatory features plus ALL defined rates, High Throughput (HT), ALL Mandatory features plus all MCS0-7, and high efficiency wireless (HEW), ALL Mandatory features.

FIG. 10B is a diagram illustrating an example 1002 of an uplink (UL) synchronization (Synch) frame. Such an UL Synch frame may be employed for various reasons including to identify UL transmitters, to establish timing for UL OFDMA transmission start, and to establish NAV to cover UL OFDMA PPDUs and MCAST BA. Such an exemplary frame may include: Frame Control (FC):PV=01b, FC:Type=TBD, FC:Subtype=TBD. SCTL contains number N of UL Transmitters. ULTList contains UL Transmitter list, per transmitter, and the AID includes 2 octets.

FIG. 10C is a diagram illustrating an example 1003 of multicast block acknowledgement (BACK) for responding to UL OFDMA. A block acknowledgement (BACK) may be employed for responding to an UL OFDMA. Such an exemplary frame may include: FC:PV=01b, FC:Type=TBD, FC:Subtype=TBD. BCTL contains number N of BA recipients. BMTList contains per recipient with AID (2 octets) and Bitmap (8 octets).

FIG. 10D is a diagram illustrating an embodiment of a method 1004 for execution by one or more wireless communication devices. The method 1004 begins by processing communications associated with other wireless communication devices to determine one or more traffic characteristics of those communications and one or more class characteristics of the other wireless communication devices (block 1011). These communications may be received via a communication device of the wireless communication device. For example, the communications may be associated with prior communications supported with the other wireless communication devices.

The method 1004 continues by classifying the communications into access categories based on the one or more traffic characteristics (block 1021) and classifying the other wireless communication devices into device class categories based on the one or more class characteristics (block 1031). The method 1004 then operates by generating at least one channel access control signal based on classification of the communications into the access categories and classification of the other wireless communication devices into the device class categories (block 1041). The at least one channel access control signal specifies channel access for at least one of the plurality of other wireless communication devices (e.g., channel and/or sub-channel assignment, one or more backoff parameters, enhanced distributed channel access (EDCA) parameters, etc.).

Then, the method 1004 continues by transmitting the at least one channel access control signal to the at least one of the other wireless communication devices (e.g., via the communication device of the wireless communication device) (block 1051).

It is noted that the various operations and functions described within various methods herein may be performed within a wireless communication device (e.g., such as by the processor 330, communication interface 320, and memory 340 as described with reference to FIG. 3A) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry configured to:
    determine backoff parameters to be used by particular communications devices for communication channel access, the backoff parameters determined based on an access category associated with communications being transmitted, a device class category associated with the particular communications devices, and at least one of a modulation coding set (MCS), a raw physical layer rate (RPR), or a media access control throughput Megabits per second value (MTM) associated with the communications being transmitted;
    generate a first signal that includes the backoff parameters;
    transmit the first signal to a plurality of other wireless communication devices;
    generate a second signal that includes at least one of a first association identifier (AID) value that specifies a first other wireless communication device of the plurality of the other wireless communication devices that is included within a first device class category or a second AID value that specifies a second other wireless communication device of the plurality of the other wireless communication devices that is included within a second device class category that is different than the first device class category and that also specifies orthogonal frequency division multiple access (OFDMA) sub-carriers of at least one narrowband sub-channel to be used by at least one of the first other wireless communication device or the second other wireless communication device for the communication channel access;
    transmit the second signal to the plurality of other wireless communication devices; and
    receive from the second other wireless communication device a third signal upon elapse of a period of time that is based on the backoff parameters after transmission of the second signal.

2. The wireless communication device of claim 1, wherein the at least one of the communication interface or the processing circuitry is further configured to:
    receive from the first other wireless communication device a fourth signal upon elapse of another period of time that is based on a short inter-frame space (SIFS) after transmission of the second signal.

3. The wireless communication device of claim 1, wherein the at least one of the communication interface or the processing circuitry is further configured to:
    transmit the first signal to the plurality of other wireless communication devices to indicate a start of a polling period to collect pending data information that the at least one of the first other wireless communication device or the second other wireless communication device includes to be transmitted to the wireless communication device; and
    receive, in response to the first signal, from the at least one of the first other wireless communication device or the second other wireless communication device a fourth signal that includes the pending data information that the at least one of the first other wireless communication device or the second other wireless communication device includes to be transmitted to the wireless communication device.

4. The wireless communication device of claim 1, wherein the plurality of other wireless communication devices are classified into a plurality of device class categories based on one or more class characteristics of the plurality of other wireless communication devices, wherein at least one of the plurality of other wireless communication devices is operative with a first communication standard and at least one other of the plurality of other wireless communication devices is operative based on a second communication standard that is different than and a legacy communication standard to the first communication standard.

5. The wireless communication device of claim 1, wherein the backoff parameters for communication channel access included within the first signal includes first one or more backoff parameters to be used by the second other wireless communication device and second one or more backoff parameters to be used by a third other wireless communication device of the plurality of the other wireless communication devices.

6. The wireless communication device of claim 1, wherein the second signal includes an AID value that specifies the first other wireless communication device that is included within the first device class category and excludes any AID value that specifies the second other wireless communication device that is included within the second device class category.

7. The wireless communication device of claim 1, wherein the second signal specifies the OFDMA sub-carriers that are partitioned into a first at least one narrowband sub-channel to be used by the at least one of the first other wireless communication device and also a second at least one narrowband sub-channel to be used by the second other wireless communication device for the communication channel access.

8. The wireless communication device of claim 1 further comprising:
an access point (AP), wherein the plurality of other wireless communication devices includes a wireless station (STA).

9. A wireless communication device comprising:
a communication interface; and
processing circuitry that is coupled to the communication interface, wherein at least one of the communication interface or the processing circuitry configured to:
transmit a first signal to a plurality of other wireless communication devices to indicate a start of a polling period to collect pending data information that at least one of a first other wireless communication device of the plurality of other wireless communication devices or a second other wireless communication device of the plurality of other wireless communication devices includes to be transmitted to the wireless communication device, wherein the first signal includes a control frame indicating polling restrictions associated with an uplink channel access method, and a backoff parameter determined based on an access category associated with communications being transmitted, device class categories associated with the other wireless communications devices, and at least one of a modulation coding set (MCS), a raw physical layer rate (RPR), or a media access control throughput Megabits per second value (MTM) associated with the communications being transmitted; and
receive, in response to the first signal, from the at least one of the first other wireless communication device or the second other wireless communication device a second signal that includes the pending data information that the at least one of the first other wireless communication device or the second other wireless communication device includes to be transmitted to the wireless communication device.

10. The wireless communication device of claim 9, wherein the at least one of the communication interface or the processing circuitry is further configured to:
generate a third signal that includes modified backoff parameters for communication channel access;
transmit the third signal to the plurality of other wireless communication devices;
generate a fourth signal that includes at least one of a first association identifier (AID) value that specifies a first other wireless communication device of the plurality of the other wireless communication devices that is included within a first device class category or a second AID value that specifies a second other wireless communication device of the plurality of the other wireless communication devices that is included within a second device class category that is different than the first device class category and that also specifies orthogonal frequency division multiple access (OFDMA) sub-carriers of at least one narrowband sub-channel to be used by at least one of the first other wireless communication device or the second other wireless communication device for the communication channel access;
transmit the fourth signal to the plurality of other wireless communication devices; and
receive from the second other wireless communication device a fifth signal upon elapse of a period of time that is based on the modified backoff parameters after transmission of the fourth signal.

11. The wireless communication device of claim 10, wherein the at least one of the communication interface or the processing circuitry is further configured to:
receive from the first other wireless communication device a sixth signal upon elapse of another period of time that is based on a short inter-frame space (SIFS) after transmission of the fourth signal.

12. The wireless communication device of claim 10, wherein:
the fourth signal includes an AID value that specifies the first other wireless communication device that is included within the first device class category and excludes any AID value that specifies the second other wireless communication device that is included within the second device class category; and
the fourth signal specifies the OFDMA sub-carriers that are partitioned into a first at least one narrowband sub-channel to be used by the at least one of the first other wireless communication device and also a second at least one narrowband sub-channel to be used by the second other wireless communication device for the communication channel access.

13. The wireless communication device of claim 9 further comprising:
an access point (AP), wherein the plurality of other wireless communication devices includes a wireless station (STA).

14. A method for execution by a wireless communication device, the method comprising:
determining backoff parameters to be used by particular communications devices for communication channel access, the backoff parameters determined based on an access category associated with communications being transmitted, device class categories associated with the particular communications devices, and at least one of a modulation coding set (MCS), a raw physical layer rate (RPR), or a media access control throughput Megabits per second value (MTM) associated with the communications being transmitted;
generating a first signal that includes the backoff parameters;
transmitting, via a communication interface of the wireless communication device, the first signal to a plurality of other wireless communication devices;
generating a second signal that includes at least one of a first association identifier (AID) value that specifies a first other wireless communication device of the plurality of the other wireless communication devices that is included within a first device class category or a second AID value that specifies a second other wireless communication device of the plurality of the other wireless communication devices that is included within a second device class category that is different than the first device class category and that also specifies orthogonal frequency division multiple access (OFDMA) sub-carriers of at least one narrowband sub-channel to be used by at least one of the first other wireless communication device or the second other wireless communication device for the communication channel access;

transmitting, via the communication interface of the wireless communication device, the second signal to the plurality of other wireless communication devices; and receiving, via the communication interface of the wireless communication device, from the second other wireless communication device a third signal upon elapse of a period of time that is based on the backoff parameters after transmission of the second signal.

15. The method of claim 14 further comprising:

receiving, via the communication interface of the wireless communication device, from the first other wireless communication device a fourth signal upon elapse of another period of time that is based on a short inter-frame space (SIFS) after transmission of the second signal.

16. The method of claim 14 further comprising:

transmitting, via the communication interface of the wireless communication device, the first signal to the plurality of other wireless communication devices to indicate a start of a polling period to collect pending data information that the at least one of the first other wireless communication device or the second other wireless communication device includes to be transmitted to the wireless communication device; and receive, via the communication interface of the wireless communication device, from the at least one of the first other wireless communication device or the second other wireless communication device a fourth signal that includes the pending data information that the at least one of the first other wireless communication device or the second other wireless communication device includes to be transmitted to the wireless communication device.

17. The method of claim 14, wherein the backoff parameters for communication channel access included within the first signal includes first one or more backoff parameters to be used by the second other wireless communication device and second one or more backoff parameters to be used by a third other wireless communication device of the plurality of the other wireless communication devices.

18. The method of claim 14, wherein the second signal includes an AID value that specifies the first other wireless communication device that is included within the first device class category and excludes any AID value that specifies the second other wireless communication device that is included within the second device class category.

19. The method of claim 14, wherein the second signal specifies the OFDMA sub-carriers that are partitioned into a first at least one narrowband sub-channel to be used by the at least one of the first other wireless communication device and also a second at least one narrowband sub-channel to be used by the second other wireless communication device for the communication channel access.

20. The method of claim 14, wherein the wireless communication device includes access point (AP), and the plurality of other wireless communication devices includes a wireless station (STA).

* * * * *